United States Patent [19]

Wehrle

[11] Patent Number: 4,733,026

[45] Date of Patent: Mar. 22, 1988

[54] ADJUSTABLE SWITCH AND ACTUATOR ARM

[75] Inventor: Gerhard Wehrle, Donaueschingen, Fed. Rep. of Germany

[73] Assignee: Dieter Graesslin Feinwerktechnik, Fed. Rep. of Germany

[21] Appl. No.: 10,985

[22] Filed: Feb. 5, 1986

[30] Foreign Application Priority Data

Feb. 5, 1986 [DE] Fed. Rep. of Germany ....... 8602885

[51] Int. Cl.[4] ...................... H01H 43/10; H01H 3/42; F16H 53/00

[52] U.S. Cl. ............................. 200/38 D; 200/153 L; 74/568 T

[58] Field of Search .............. 200/1 R, 153 LA, 38 R, 200/38 B, 38 BA, 38 C, 38 D, 38 DA, 38 DB, 38 DC, 38 E, 153 T, 330, 332, 338; 74/568 R, 568 FS, 568 T, 568 M

[56] References Cited

U.S. PATENT DOCUMENTS

| | | | |
|---|---|---|---|
| 3,747,432 | 7/1973 | Cole | 200/38 CA X |
| 3,821,529 | 6/1974 | Kullage, Jr. et al. | 200/332 X |
| 4,160,885 | 7/1979 | Ellicott et al. | 200/1 R |
| 4,297,546 | 10/1981 | Koch | 200/38 D X |
| 4,349,711 | 9/1982 | Lake | 200/153 T X |
| 4,436,969 | 3/1984 | Motoki | 200/38 CA X |

*Primary Examiner*—J. R. Scott

*Attorney, Agent, or Firm*—Hill, Van Santen, Steadman & Simpson

[57] ABSTRACT

An electrical appliance switch has a switchable contact assembly and a switch controller. An actuator is in contact with the switch controller and has detent toothing on at least a portion thereof. A longitudinal adjustment cam has at least one notch for frictionally engaging the detent toothing. The adjustment cam has an oblong tubular configuration for surrounding a portion of the actuator and has a closed bottom end. The adjustment cam contacts the switchable contact assembly. Adjustment of the adjustment cam substantially sets a lead path of the actuator. The actuator cam has at least one cam face which has a slanting plane configuration for contacting the switchable contact assembly. Adjusting the actuation cam causes the cam face to change a transmission ratio of a longitudinal displacement path of the actuation cam to a cam spread displacement.

7 Claims, 3 Drawing Figures

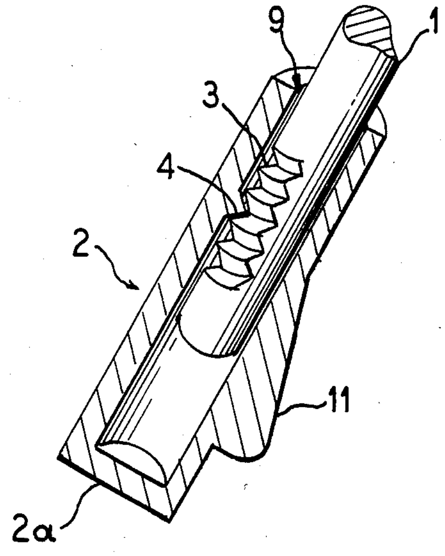
FIG. 1A
FIG. 2
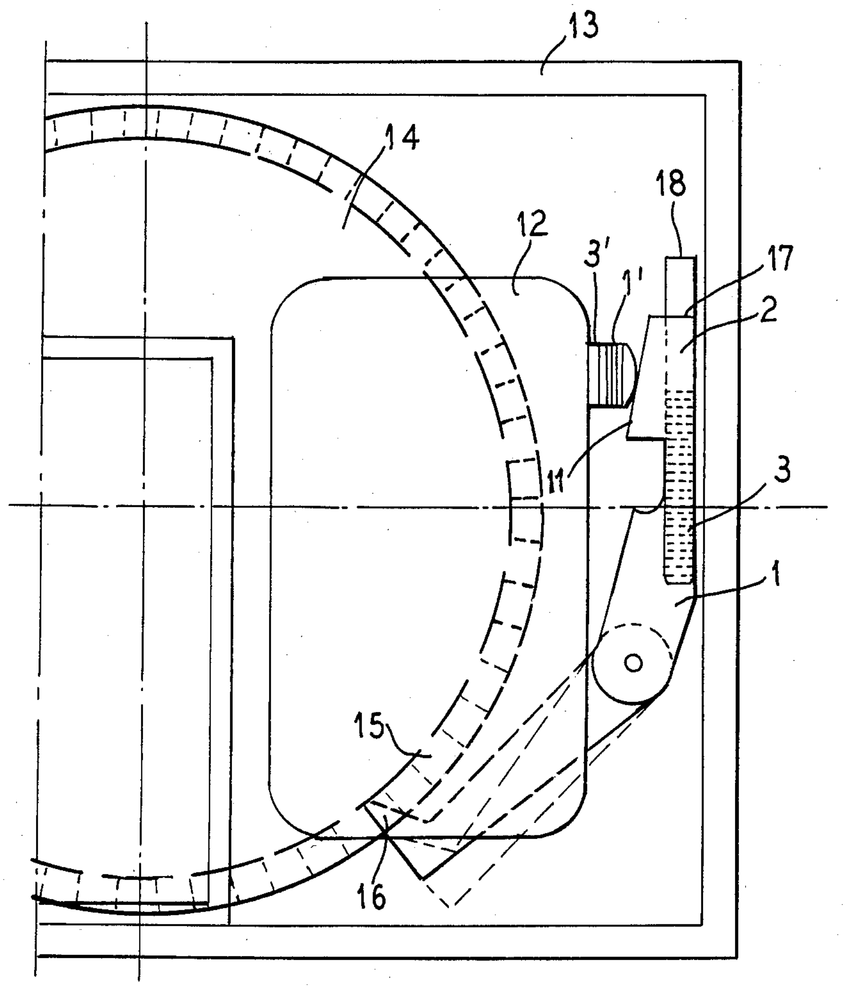

ADJUSTABLE SWITCH AND ACTUATOR ARM

BACKGROUND OF THE INVENTION

This invention relates generally to electrical appliance switches and, in particular, to a switch having an actuation cam on an actuator for setting a lead path of the actuator relative to a switch control mechanism.

In prior art switches, particularly built-in appliance switches, such as microswitches and device integrated switches, it is often necessary to adapt the lead path of an actuator of the switch to a manual or mechanized switch control. In some cases, the lead path of the actuator must be set for certain defined, invariable dimensions of the switch control mechanism, and in other cases it must be set because of varying tolerances of the switch control mechanism. The lead path of the actuator in certain instances must be adjusted in respect to the free play of the switch control mechanism. It is desirable that the compensation of any lead tolerance between the idle position of the actuator of the switch and the switch control mechanism be carried out in a simple and economical manner.

Known devices of the type for setting or compensating the lead path of the actuator relative to the switch control mechanism all work with a set screw located on the actuator. The screw head of the set screw frequently forms the actuator cam that is contacted by the switch control mechanism.

These prior art mechanisms have the disadvantage that the use of a set screw is not only costly to manufacture and service, but frequently cannot be employed because of the small dimensions of the actuator. Particularly in microswitches and device integrated switches, the actuator is often too small for a set screw having the required adjustment range to be located on the actuator or in the region of an actuator cam.

The present invention overcomes these drawbacks of the prior art.

SUMMARY OF THE INVENTION

It is an objective of the present invention to eliminate the above-described disadvantages of prior art switches and to provide a means for setting or compensating for the tolerance of the lead path of the switch actuator to the switch control mechanism. It is an advantage of the present invention that the switch actuator can be operated in a straightforward manner and still may have relatively small dimensions. It is a feature of the present invention that the novel lead path adjusting mechanism can be economically manufactured and assembled.

The electrical appliance switch of the present invention has an actuation cam arranged longitudinally displaceable on the actuator and is annularly fashioned. The actuation cam is in frictional engagement with the actuator. A locking feature can also be provided in order to secure the cam in a set position. To provide for the frictional engagement, a detent toothing is provided on the actuator and engages at least one notch on the actuation cam. The size of the detent toothing can be dimensioned to provide a desired adjusting sensitivity. In certain applications, such an actuation cam can even be fashioned in an oblong tubular configuration with one bottom end of the cam closed for overall reinforcement.

The present invention has the advantage that it is not only simple and economical to manufacture, but it also provides expedient operation even given extremely small dimensions of the actuator. The actuation cam can advantageously be formed from a plastic material.

BRIEF DESCRIPTION OF THE DRAWINGS

The features of the present invention which are believed to novel are set forth with particularity in the appended claims. The invention, together with further objects and advantages, may best be understood by reference to the following description, taken in conjunction with the accompanying drawings, the several figures of which like reference numerals identify like elements, and in which:

FIG. 1*a* is a partial perspective view of an alternative embodiment of the actuation cam located on the actuator; and FIG. 2 is a plan view of a switch control of a switch clock which has a programmable index ring which operates a microswitch in conformity with a switching program via an actuator which has an actuation cam for compensating for the lead path of the actuator.

DESCRIPTION OF THE PREFERRED EMBODIMENT

Figure 1:
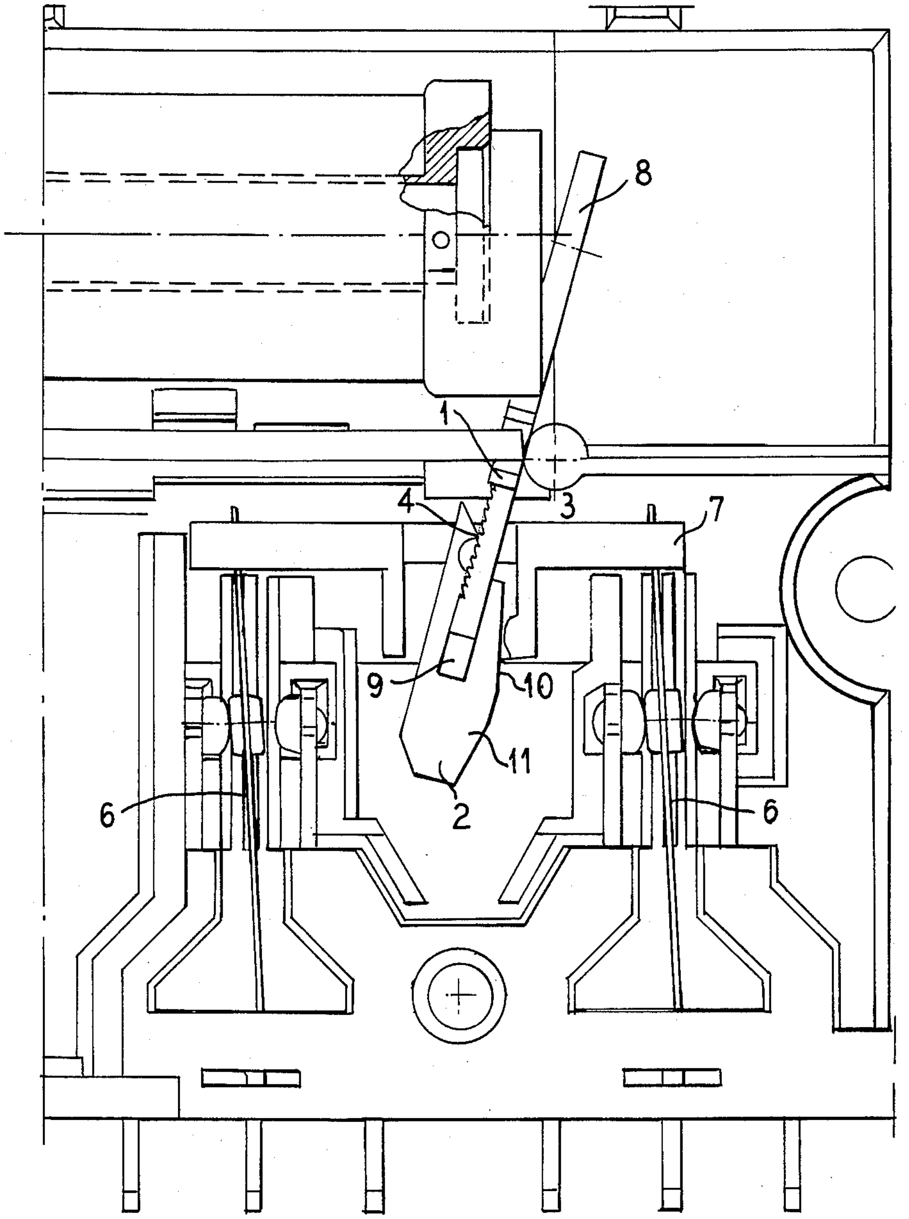
FIG. 1 is a front view of a device integrated double switch having a shared, electromagnetically operated actuator with an actuation cam for compensating for the lead path of the actuator.

The present invention has general applicability but is preferably utilized in a device integrated double switch as shown in FIG. 1. This switch has two sets 6 of contacts that are coupled to one another with an actuator bridge 7. An actuator 1 is connected to an armature 8 of an electromagnetic switch control. An actuator cam 2 has a notch 4 for frictionally engaging and locking detent toothing 3 on a surface of the actuator 1. The actuation cam 2 is capable of axial longitudinal displacement on the actuator 1. With this arrangement of the actuation cam 2 and actuator 1, it is thus possible to adapt the lead path of the switch to the control path of the electromagnetic switch control and substantially reduce any free play therein.

This novel arrangement makes is possible that the switch actuating force of the sets 6 of contacts can also be set within certain limits with the adjustable actuation cam 2. Moreover, it is possible to use the adjustable actuation cam 2 to vary or adapt the transmission ratio between the actuator bridge 7 and the armature 8 to relatively small ratios.

The actuation cam 2 can be fashioned in an oblong tubular configuration, such as a jacket shown in FIG. 1*a*, whereby a bottom end 2*a* may be closed. The bottom end 2*a* is located opposite an end of the actuation cam 2 which has the inside opening 9 and also is opposite the notch 4. It is to be understood that reference to the notch 4 refers to the overall configuration of the portion of the actuation cam 2 which engages the detent toothing 3 on the actuator 1. For certain applications, however, it may also be provided that side regions of the actuation cam 2 are open so that the actuation cam 2 actually comprises a U-shaped cross-section, as shown in FIG. 1. Furthermore, a cam face 10 can be provided with a slanting plane 11 or other appropriate geometric shape which changes the transmission ratio of the longitudinal displacement path of the actuation cam 2 on the actuator 1 to the cam spread displacement by more than the ratio of one to one. The cam spread displacement being the distance the actuation cam 2 moves in response to the movement of the electromagnetic switch control.

FIG. 2 shows a microswitch 12 in a switch clock 13 which is operated by a lever-like actuator 1 seated externally of the switch 12. A longitudinally displaceable actuating cam 2, with which the lead path of the actuator 1 can be set or compensated for, is located on the actuator 1. An index ring 14 has switch jockeys 15 programmably arranged on a circumference thereof which operate the actuator 1 via the arm 16 in conformity with the switching program.

As is shown in the FIGS. 1 and 2, the actuating cam 2 also has a slanting plane 11 which greatly changes the longitudinal displacement ratio in favor of the cam spread. Detent toothing 3 on the lateral face 17 of the actuator 1 shown in FIG. 2 functions according to the description of the detent toothing 3 shown in FIG. 1. One or more notches 4 on the actuating cam 2 engage the detent toothing 3, but are not visible in the FIG. 2.

It is also provided in FIG. 2 that the adjustable, axially or longitudinally displaceable actuating cam 2 can be arranged directly on the switch internal actuator 1' when this is advantageous in specific applications. In this embodiment, detent toothing 3' would be on the actuator 1' so that the lead path between the actuator 1' and the free lever end 18 of the actuator 1 could be set.

Other variations are envisioned for the present invention, the actuating cam 2 may be seated on the actuator 1 centrifically and can be turned about the axis or placed at a right angle relative to the axis of the actuator 1 for setting or compensating for the lead path.

The invention is not limited to the particular details of the apparatus depicted and other modifications and applications are contemplated. Certain other changes may be made in the above described apparatus without departing from the true spirit and scope of the invention herein involved. It is intended, therefore, that the subject matter in the above depiction shall be interpreted as illustrative and not in a limiting sense.

I claim:

1. A lead path adjusting mechanism for an electrical appliance switch having a switchable contact assembly activated by an actuator having a predetermined lead path, the actuator operated by a switch control, comprising:

longitudinal actuation cam adjustably located on the actuator and in contact with the switchable contact assembly, said actuation cam having a jacket which annually surrounds said actuator.

2. The adjusting mechanism described in claim 1, wherein said jacket is substantially closed.

3. The adjusting mechanism described in claim 1, wherein said jacket has an axial slot.

4. An electrical appliance switch having a switchable contact assembly, comprising:

means for providing switch control;

means for actuating in contact with said switch control means;

means for adjusting a lead path of said actuating means, said means for adjusting engaging said actuating means and contacting the switchable contact assembly, said means for adjusting having a substantially tubular jacket and substantially surrounding at least a portion of said means for actuating.

5. The switch described in claim 4, wherein said means for adjusting has an oblong tubular jacket with a closed bottom end.

6. An electrical appliance switch having a switchable contact assembly, comprising:

switch controller;

cylindrical actuator in contact with said switch controller, said actuator having detent toothing on at least a portion thereof; and adjustable longitudinal actuation cam having at least one notch for frictionally engaging said detent toothing, said actuation cam having an oblong tubular jacket for surrounding a portion of said actuator and having a closed bottom end, an inner diameter of said jacket being slightly greater than an outer diameter of said cylindrical actuator, said actuation cam contacting the switchable contact assembly;

wherein adjustment of said actuation cam substantially sets a lead path of said actuator.

7. The switch described in claim 6, wherein said actuation cam has at least one cam face formed on an outer surface of said jacket which has a slanting plane configuration for contacting the switchable contact assembly.

* * * * *